May 28, 1963 C. C. LAWLESS ETAL 3,091,471
PACKING BOX ASSEMBLY
Filed March 17, 1960
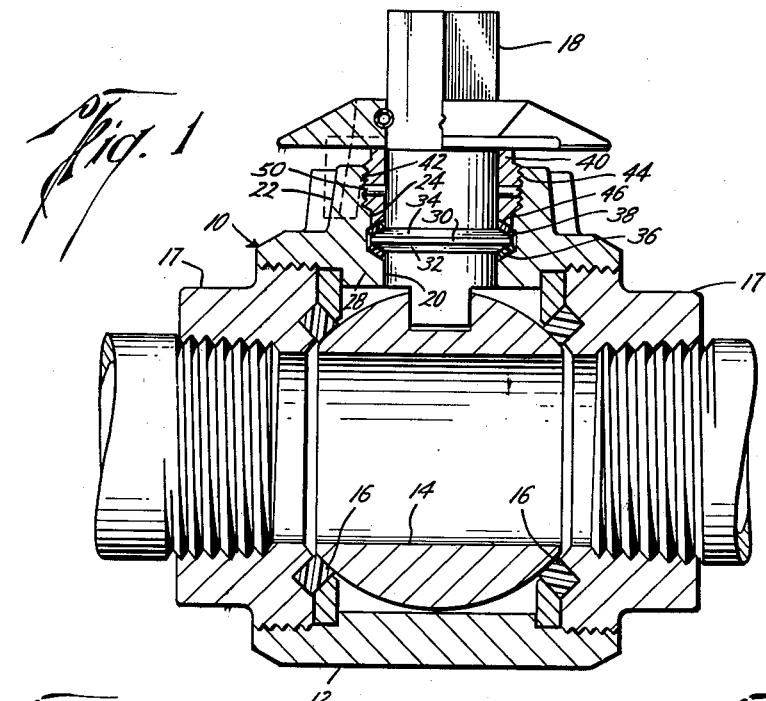
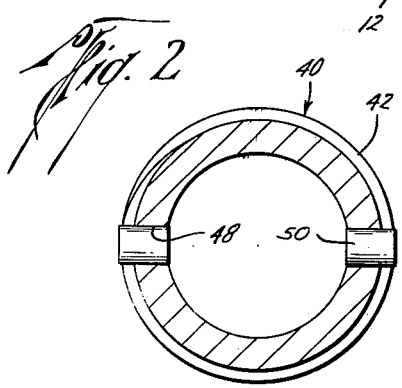
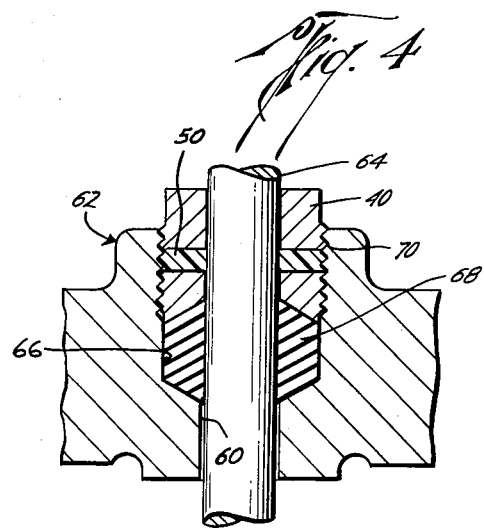
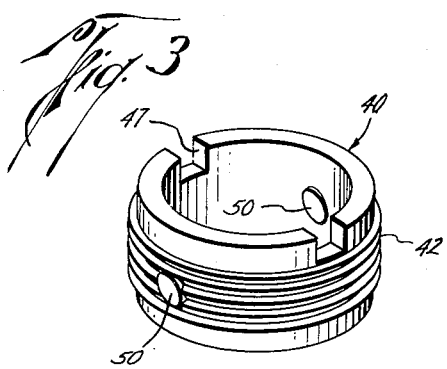
Clifford C. Lawless
Alton M. Williamson
INVENTORS
BY
ATTORNEY

United States Patent Office 3,091,471
Patented May 28, 1963

3,091,471
PACKING BOX ASSEMBLY
Clifford C. Lawless, Stafford, and Alton M. Williamson, Houston, Tex., assignors to ACF Industries, Incorporated, New York, N.Y., a corporation of New Jersey
Filed Mar. 17, 1960, Ser. No. 15,562
2 Claims. (Cl. 277—112)

This invention relates to packing box assemblies for rotary plug valves, rising and non-rising stem valves.

In rotary type plug valves, the rotation of the plug element is controlled by an operating stem which extends through a passage in the body. Since there is pressure in the body, it is necessary to provide packing between the stem and the passage to prevent leakage around the stem. One means of forming such packing is shown in Clade Patent 2,861,773. An operating stem extends from the valve body through an aperture into a larger bore. The operating stem has an annular flange and packing rings are located on each side of the flange. A stem nut completes the assembly. The stem nut controls the pressure on the packing. It is desirable that the stem nut remains stationary during the normal course of valve usage. However, since the stem nut controls the compression on the packing and since the tightness of the packing affects the torque necessary to operate the valve, in certain instances the stem nut may be backed off from the original position in order to reduce the operating torque. In such instances, the stem nut may continue to work loose to a point where stem leakage occurs. Accordingly, it is particularly desirable to have a stem nut which will remain stationary at all times and the stem nut of the present invention is so designed that it will remain stationary even though it may not be bottomed. To accomplish this, the stem nut is provided with two diametrically opposed small apertures into which are pressed inserts of a material which is capable of being deformed without taking a permanent set and which tends to return to its original shape gradually. These inserts bear against the stem on one side and the internal thread of the passage on the other side. The inserts have the characteristic of locking the stem nut against turning due to the friction produced by the inserts with the internal threads.

The stem nut of the present invention is equally applicable to packing boxes for rising or non-rising stem valves.

It is an object of the present invention to provide a stem nut for a packing box assembly which will remain satisfactory in any position.

It is another object to provide a stem nut for a packing box assembly having two diametrically opposed apertures provided with inserts of deformable resilient material which act as locks to hold such stem nut stationary in any position.

It is another object to provide a packing box assembly for a valve in which the stem nut will remain stationary whether it is screwed tightly in position or at an intermediate point.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

FIG. 1 is an elevational view in section of a rotary ball valve incorporating the packing box of the present invention.

FIG. 2 is a top view in section of the stem nut.

FIG. 3 is a perspective view of the stem nut.

FIG. 4 is a cross sectional view of a packing for a rising stem valve.

Referring now to the drawings in detail, it will be seen that the rotary plug valve 10 shown in FIG. 1 consists of a generally tubular body 12 within which is rotatably mounted a spherical plug 14 held in position centrally of the body between seats 16—16 by closures 17—17. Rotation of the spherical plug 14 is controlled by a stem 18 which extends outwardly of the body 12 through bore 20 in a boss 22 located on the top of the body 12. Outward of the bore 20 there is an enlarged chamber 24, concentric with the bore 20, which is of a greater diameter than the bore 20. There is a sloping shoulder 28 connecting the bore 20 and chamber 24. The aperture 20 is proportioned to accommodate the stem 18. The chamber 24 is proportioned to accommodate the stem and its packing. The stem 18 is provided with an annular flange portion 30 which has tapering surfaces 32—34. Positioned between the sloping shoulder 28 and tapering surface 32 of the stem is a packing ring 36. Located on the outward tapering surface 34 there is a second packing ring 38. These sealing rings 36 and 38 are preferably made of a chemically inert material such as polytetrafluoroethylene and initially flat. Completing the packing assembly is a stem nut 40 which is an annular ring having threads 42 on its external surface and a smooth inner surface. The threads 42 are threadedly engaged with internal threads 44 located in the outer end of the chamber 24. The inner end of the stem nut 40 is provided with a tapering surface 46 generally parallel to the tapering surface 34. To permit the stem nut 40 to be rotated, the outer end of the stem nut is provided with two slots 47 which will accept the ends of a spanner wrench. By tightening the stem nut 40, the tapering surfaces 28, 32, 34 and 46 form the initially flat packing rings 36—38 into frusto conical rings. The stem nut 40 controls the deformation of the packing rings. The tighter the nut 40 the more the packing rings are compressed and therefore the more tightly they contact the stem and side wall of the chamber 24. However, the tighter the contact between the packing rings and stem the greater the friction and therefore the higher the torque necessary to turn the stem 18. If the threads 42 of the stem nut 18 are fully engaged with the threads 44 of the chamber 24, the friction between the threaded surfaces plus the force with which the packing rings 36—38 tend to resist compression will maintain tight engagement. However, if the stem nut 18 is backed off to relieve the pressure on the packing rings to make turning of the stem easier, the friction between the threaded surfaces is reduced and the resistive force of the packing rings 36—38 is partially eliminated and, therefore, the stem nut 40 may work loose. The stem nut 40 may back off sufficiently so that the compression force on the packing rings 36—38 is reduced to a point where they no longer establish a seal permitting leakage to result. To alleviate this condition and maintain the stem nut 40 stationary even though it is not fully in threaded engagement, the stem nut 40, as can be seen in FIGS. 2 and 3, is provided with diametrically opposed apertures 48—48 positioned approximately midway of the axial length of the threads 42. Positioned in each of these apertures is a small insert 50 of a resilient deformable plastic material having a high rate of recovery. While many and various materials, including metals and plastics, are suitable for the inserts 50, the rapidity of recovery and the elasticity or resiliency of the material selected is important. Other factors include temperature to which the stem nut will be subjected in service. However, it has been determined that for ordinary use at normal temperatures, the material known as "nylon" gives excellent results. By the term nylon, it is meant a synthetic linear polymide. Nylon has the property of tending to return to its original shape after being deformed, hence it does not take a permanent set and may be repeatedly used. The inserts 50 are pressed into the apertures and are proportioned so that the ends of the insert protrude from both the inner diameter and outer diameter of the stem nut 40. As assembled, the insert 50 protrudes on the inner diametrical surface to form a chord between the outermost points of the aperture 48 and the inner diametrical surface of the stem nut 40. The protrusion of the insert 50 on the outer diametrical surface is tangential to the crest of the threads 42. The stem nut 40 is telescoped over the stem 18 and threaded into the chamber 24. In telescoping the stem nut 40 over the stem 18, the protrusion of the insert 50 on the diametrical surface is confined by the stem and generally conforms to the shape of the stem 18. As the inserts 50 come into contact with the internal threads 44 of the chamber 24, the excess material will be either shaved off or compressed and take the general form of the thread and fill the clearance between the two mating threads. While the inserts 50 will not offer drag of such magnitude as to make the threading difficult, it will be of sufficient magnitude to resist free disengagement regardless of where the stem nut 40 is positioned as long as the inserts 50 are in threaded contact. By having the diametrically opposed inserts 50, there will be no tendency for the stem 18 to be forced against the opposite wall of the stem nut 40 and cause binding as would result if only one insert were used. In other words, by using two inserts, the force exerted by the inserts is balanced. The tendency of the stem nut 40 to resist free disengagement results from the friction of the insert 50 gripping the threads 44 and not from the binding of the stem 18. Accordingly, the inclusion of the inserts 50 does not result in increasing torque necessary to operate the valve.

Instead of the rotary plug valve shown in FIG. 1, the stem nut 40 may be utilized in a packing box for a non-rising stem valve in which case the construction would be similar to the packing box shown in FIG. 1, that is, the stem would be held captive as to reciprocatory movement. Also, the stem nut 40 may be used in packing boxes for rising stem valves as shown in FIG. 4 whereas in the case of the packing box of FIG. 1 there is an aperture 60 in the valve body 62 communicating with the interior of the valve body. A stem 64 extends outwardly from the valve through said aperture. Concentric with said aperture 60 there is a bore 66 which is of greater diameter than the aperture 60. Packing rings 68 are positioned in said bore 66. To close the bore 66, the upper end is provided with threads 70. Stem nut 40 is engaged with the threads 70 and by threading said nut inward pressure is exerted on the packing rings 68. As in the previous case, the threads 70 contact and deform the inserts 50 causing the inserts 50 to assert a functional drag on the stem nut 40 to prevent free disengagement of the stem nut 40.

It has been found that by utilizing the stem nut of the present invention that the degree of tightness on the packing rings can be carefully controlled and that it is not necessary to fully engage the packing ring to maintain it stationary.

As various changes may be made in the form, construction and arrangements of the parts herein without departure from the spirit and scope of the invention and without sacrificing any of its advantages, it is to be understood that all matter herein is to be interpreted as illustrative and not in a limiting sense.

We claim:

1. A packing box structure including a body portion formed with a cylindrical bore therethrough, a rotatable cylindrical stem having a smooth outer surface extending through said bore, the wall of said cylindrical bore being formed with a concentric enlarged chamber extending outwardly through said body portion and terminating at its inner end in an annular shoulder, packing in said bore supported on said shoulder, threads formed at the outer end portion of the wall defining the enlarged chamber, a stem nut having internal threads for engaging the outer threaded portion of the enlarged chamber, said stem nut being provided with a central opening of the approximate diameter of said stem and being telescoped over said stem, said stem nut engaging said packing at its lower end portion to compress the latter into sealing contact with said shoulder, bore and stem, the wall of said stem nut being formed with a plurality of radially extending apertures, said apertures opening at their outermost points within the threaded area of said stem nut, plastic inserts pressed into said apertures, said inserts protruding inwardly to form a chord between the outermost points of said aperture and protruding outwardly tangentially with the crest of said threads, said inserts being formed of resilient deformable plastic material having a high rate of recovery from compression, said stem confining the inner protrusion of said inserts and being centered thereby, and the internal threads of said enlarged chamber contacting and deforming the outer protrusion of said inserts causing the inserts to act as a functional drag on the stem nut to prevent its free rotational movement and displacement.

2. The structure of claim 1 characterized in that an annular flange is formed on said stem of approximately the diameter of the concentric enlarged chamber, and a packing ring is positioned between the inner face of the flange and the annular shoulder and the outer face of the flange and the adjacent face of the stem nut.

References Cited in the file of this patent

UNITED STATES PATENTS

| | | |
|---|---|---|
| 230,009 | Harding | July 13, 1880 |
| 866,062 | Pierce | Sept. 17, 1907 |
| 945,433 | Allen | Jan. 4, 1910 |
| 1,619,211 | Maxwell | Mar. 1, 1927 |
| 2,456,623 | Cooper | Dec. 21, 1948 |
| 2,646,959 | Carver | July 28, 1953 |
| 2,663,344 | Burdick | Dec. 22, 1953 |
| 2,831,713 | Smith | Apr. 22, 1958 |
| 2,880,830 | Rohe | Apr. 7, 1959 |
| 2,957,196 | Kreider et al. | Oct. 25, 1960 |

OTHER REFERENCES

"Electronics," April 1945, 286–37.